Aug. 11, 1931.  C. S. BUSHNELL  1,818,941
BRAKE APPLYING APPARATUS
Filed May 17, 1929
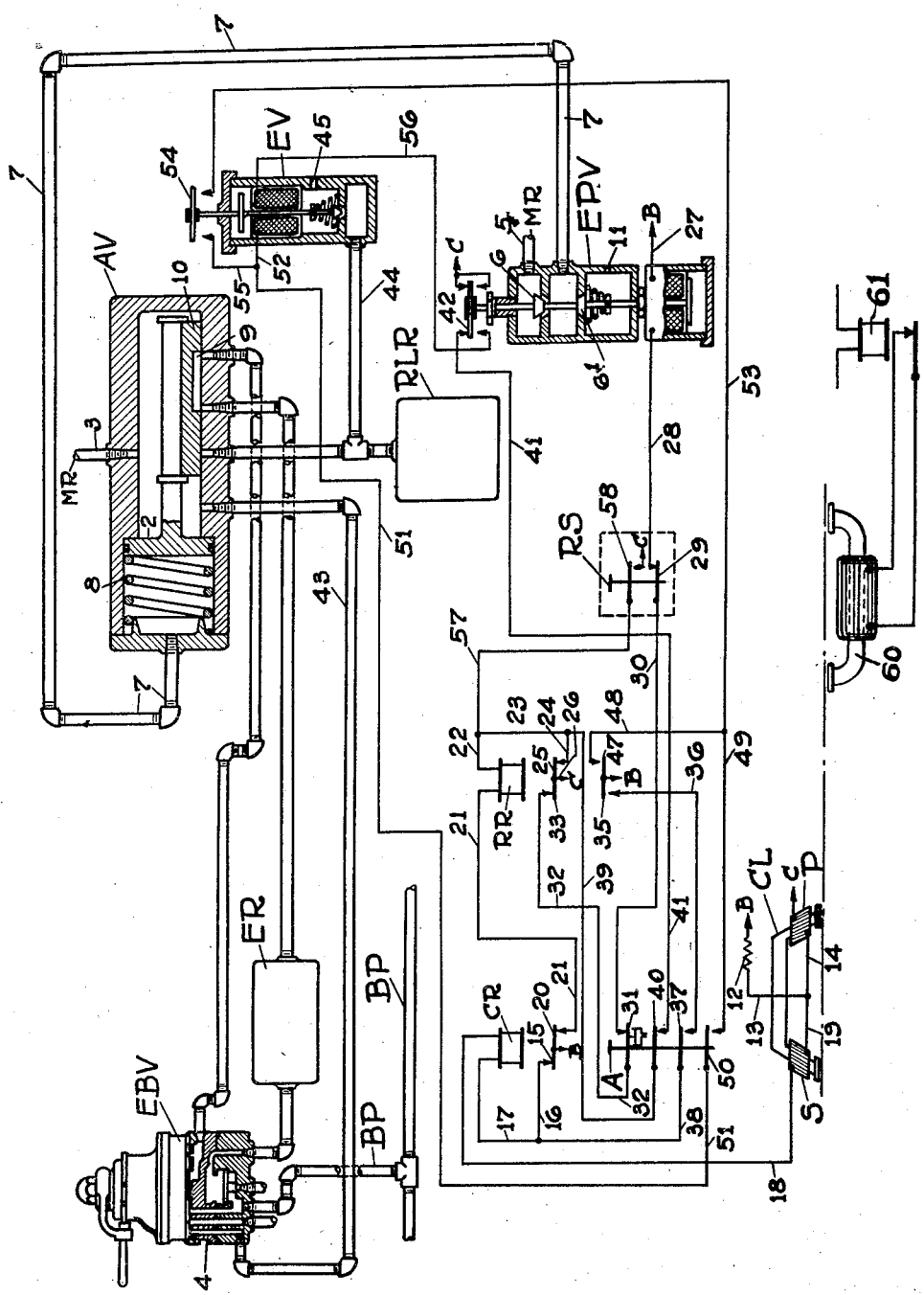
INVENTOR
*C. S. Bushnell,*
BY *Neil D. Preston,*
his ATTORNEY Patented Aug. 11, 1931

1,818,941

UNITED STATES PATENT OFFICE

CHARLES S. BUSHNELL, OF ROCHESTER, NEW YORK, ASSIGNOR TO GENERAL RAILWAY SIGNAL COMPANY, OF ROCHESTER, NEW YORK

BRAKE APPLYING APPARATUS

Application filed May 17, 1929. Serial No. 363,739.

This invention relates to a train control apparatus, and more particularly to automatic brake control apparatus constructed to vent the brake pipe of the usual air brake system to a predetermined limited extent.

In automatically applying the brakes of a train by an air brake system of the normally charged brake pipe type, it is found advantageous to vent the brake pipe to a limited extent only, this for the reason that a full-service brake application may be obtained even though the brake pipe is only partially vented. From this it appears that upon venting of the brake pipe, that venting which takes place after a full-service brake application has been made is wasteful venting, and not only must this air wastefully vented be replaced, but it takes longer to release the brakes than would otherwise be the case. In other words, it is not only economical but desirable from an operating standpoint that a brake pipe should only be vented to a limited extent. On the other hand, it is possible, if brake pipe venting is limited by suitable automatic means, that under certain peculiar conditions, such as obtaining an automatic brake application immediately after or while the engineer's brake valve is in the release position, insufficient venting will occur, and for this reason it is desirable to check the alertness of the engineer while an automatic brake application takes place.

In accordance with the present invention it is proposed to apply automatic brake control apparatus to an auto-manual train control system including suitable acknowledging means, and to so co-ordinate the train control and brake control apparatus that the engineer must not only acknowledge his passage of a caution or danger signal to avoid an automatic brake application, but also must make an acknowledging act in order to obtain a brake application of limited reduction, rather than a brake application in which the brake pipe is vented to zero pressure.

Other objects, purposes and characteristic features of the invention will appear from the accompanying drawing and the following detailed description:—

In describing the invention in detail, reference will be made to the single accompanying drawing, showing an auto-manual train control system of the intermittent inductive type co-ordinated with suitable automatic brake control apparatus.

Referring to the drawing the engineer's brake valve EBV is one of the usual construction, such as the H6 or G6 Westinghouse brake valve, having its upper and lower part divided by an insert 4, such as the insert 4 shown in my prior application Ser. No. 302,237 filed August 27, 1928, and having associated therewith the usual equalizing reservoir ER, an application valve AV controlled by the control relay CR through the medium of a repeater relay RR. The brake control apparatus also includes a reduction limiting reservoir RLR into which the equalizing reservoir is vented to obtain a limited reduction providing the engineer has made an acknowledging act and has energized the electrically-operated valve EV. It is believed that the invention is best understood by considering the operation of the system.

*Operation.*—Under normal conditions the brake pipe BP is charged to the usual brake pipe pressure through the medium of the engineer's brake valve EBV, the usual equalizing reservoir being charged in the usual way, except that the charging passage includes certain pipes and the cavity 9 of the slide valve 10. The application valve AV is charged by main reservoir pressure from the main reservoir MR (not specifically shown) through the medium of the pipe 3, which pressure will not urge the piston 2 toward the left because main reservoir pressure is also contained on the left of this piston derived from main reservoir MR through pipe 5, valve 6 of the device EPV, and pipe 7. This main reservoir pressure together with the pressure of the compression coil spring 8 holds the piston 2 in its right hand position. With the piston 2 in the right hand position the cavity 9 in slide valve 10 bridges the partition 4 in the engineer's brake valve.

Let us now consider the normal conditions of the electrical apparatus. Influences are transmitted from the trackway to the car-carried apparatus under adverse trackway conditions through the medium of a car element CL having a primary coil P and a secondary coil S. This car element CL has induced a potential in the secondary coil S thereof when it passes over a track element 60 controlled by the relay 61, which in turn is controlled in accordance with traffic conditions ahead. For a more clear description of the theory of inductively transmitting a communicating influence of this kind, attention is directed to my prior Patent No. 1,686,434 dated October 2, 1928. The primary coil P is normally energized by direct current through a circuit starting at the terminal B of a suitable battery, resistance unit 12, wires 13 and 14, coil P to the other terminal C of said battery. The flow of current in this circuit results in a voltage drop across the resistance 12, and this voltage drop is used as a source of low potential for energizing the relay CR through a circuit including the secondary winding S, and which circuit may be traced as follows:—beginning at the terminal B, front contact 15 of the control relay CR, wires 16 and 17, winding of the control relay CR, wire 18, secondary winding S, wires 19 and 13 to the left hand side of resistance unit 12, so that the voltage drop across the resistance 12 is the voltage impressed upon the relay CR and secondary coil S in series. From this it appears that failure such as an open circuit in coil P would effect de-energization of relay CR, thus constituting a system based on the closed circuit principle.

With the control relay CR energized the repeater relay RR is energized through the following stick circuit:—beginning at the terminal B of a suitable source of current, contacts 20 of the control relay CR, wire 21, winding of the repeater relay RR, wires 22, 23 and 24, stick contact 25 of the repeater relay RR, wire 26, to common return wire C connected to the other terminal of said source.

With the repeater relay RR energized the electro-pneumatic valve EPV is energized through the following circuit:—beginning at the terminal B of a suitable source of current wire 27, winding of device EPV, wire 28, normally closed contact 29, of a reset push button RS, only accessible from the ground, wire 30, normally closed time retarded contact 31 of the acknowledging device A, wire 32, front contact 33 of the repeater relay RR, to common return wire C, connected to the other side of said source.

Let us now assume that a train equipped with the apparatus illustrated is passing by a trackway device assuming the active stopping condition, under which condition the control relay CR is de-energized by a voltage induced in the secondary coil S, which voltage is in opposition to and neutralizes the current normally flowing in the secondary coil S. Let us assume that the engineer has been alert and has depressed the acknowledging push button A. De-energization of the control relay CR de-energizes the repeater relay RR and since both of these relays are stick relays they would remain de-energized if it were not for the following circuit closed by the engineer's act of acknowledging, which again picks up the control relay CR:—beginning at the terminal B, back contact 35 of the repeater relay RR, wire 36, normally open contact 37 of the acknowledging device A, wires 38 and 17, winding of the control relay CR, wire 18, secondary coil S, wires 19 and 13 to the side of the resistance unit 12 opposite to that of the terminal B. With the control relay CR re-energized the repeater relay RR is picked up through the following pick up circuit:—beginning at the terminal B, contact 20 of the control relay CR, wire 21, winding of the repeater relay RR, wires 22, 23, and 39, normally open contact 40 of the acknowledging device A, wire 41, contact 42 of the EPV, to common return wire C. The relays CR and RR are thus both restored because the engineer has been alert and has depressed the acknowledging push button A, the electro-pneumatic valve EPV being sufficiently slow-acting so that it will not be de-energized in response to momentary opening of its energizing circuit, so that no brake application takes place if the engineer is alert at the time an influence is transmitted from the trackway.

Let us now assume that the train passes a track element when in its active stopping condition at a time when the engineer is not alert, in which case the relays CR and RR are de-energized and the device EPV also becomes de-energized. With the device EPV de-energized fluid pressure is vented from the left hand side of piston 2 through pipe 7, valve 6¹ and exhaust port 11, thereby causing main reservoir pressure on the right hand side of this piston to operate the side valve 10 to its left hand position against the force of compression spring 8.

It will be noted that this movement of the slide valve 10 cuts off the flow of main reservoir pressure from the chamber of application valve AV to the engineer's brake valve EBV through the pipe 43. Also, with the slide valve 10 in its left hand position the cavity 9 renders the partition in the insert 4 of the engineer's brake valve EBV effective, and connects the equalizing reservoir ER to the reduction reservoir RLR, so that a limited reduction in brake pipe pressure will take place if the electric valve EV is energized to prevent the escape of equalizing reservoir pressure to atmosphere through the pipe 44 and exhaust port 45. If now the engineer is alert he may prevent such unlimited escape of equalizing reservoir pressure and may obtain a brake application of limited reduction by depressing push button A and completing the following circuit:—beginning at the terminal B of a suitable source of current, contact 47 of the repeater relay RR, wires 48 and 49, normally open contact 50 of the acknowledging device A, wires 51 and 52, winding of the valve EV, wire 56, contact 42, to common return wire C connected to the other side of said source.

It should be noted that the circuit just traced includes a back contact of the device EPV and that this valve EV is not energized during the acknowledgment of a caution or danger signal, to restore relays CR and RR, this to avoid the waste of current and unnecessary wear on valve EV.

With the device EV once energized it is energized through a stick circuit which remains closed so long as the repeater relay RR is de-energized which circuit may be traced as follows:—beginning at the terminal B, back contact 47, of the repeater relay RR, wires 48 and 53, stick contact 54 of the valve EV, wires 55 and 52, winding of the valve EV, wire 56, back contact 42 of EPV, to common return wire C. With the valve EV once picked up and stuck up the brake pipe can only be vented to a limited extent depending upon the capacity of the reduction limiting reservoir RLR, and this valve EV will remain energized through a stick circuit so that engineer may release the acknowledging button A and may devote his time to such manual control of the train as is still left to him.

The train is thus brought to a stop by an automatic brake application of limited reduction. This because the engineer acknowledges his vigilance, but did it too late to avoid the automatic brake application. It thus appears that if the engineer manifests that he is alive and not incapacitated he may avoid useless venting of the brake pipe even though he was not alert at the time he passed a signal at caution or danger. Also it is seen that the same acknowledging device may be used for both the manifestation of his vigilance when passing a signal at caution or danger and the manifestation that he is alive and not incapacitated after a brake application is imposed. Attention is directed to the time retarded slow-opening contact 31 of the acknowledging device A. This contact is employed to protect the acknowledging device against misuse, such as malicious tying down with an endeavor to obtain perpetual acknowledgment.

The train now having been brought to a stop with the brakes still applied, the engineer is required to alight to the ground to depress the reset push button RS, only accessible from the ground. Depression of push button RS closes the following pick-up circuit for the relay RR:—starting at B, contacts 20 of relay CR (this relay CR having been picked up by prior operation of the acknowledging device A), wire 21, winding of the relay RR, wires 22 and 57, contact 58 of the reset push button RS, to common return wire C. With the relay RR restored to normal the device EPV is restored to normal. With the device EPV again energized main reservoir pressure is reapplied to the left side of piston 2, thus restoring the slide valve 10 to normal, and permitting the engineer to release the brakes by recharging the brake pipe BP through the medium of pipe 43.

It is thus seen that a train control system has been devised in which the same acknowledging device may be used for entirely preventing a brake application, if the engineer has manifested his vigilance before and while he was passing an active trackway device, and that the engineer may through the medium of this same acknowledging device limit the reduction in brake pipe pressure if he manifests alertness after he has passed an active trackway device and a brake application is in the process of being consummated. Further, it is evident that the engineer in each case is required only to operate the acknowledging device for a short period of time, so as not to detract him from his other duties such as bringing about a manual brake application. Putting it still another way, the system embodying the present invention imposes a brake application as a penalty if the engineer does not acknowledge his vigilance upon passage of his train by an active trackway device, and further penalizes him, by a brake application in which the brake pipe is vented to zero, if he does not make an acknowledging act after passing an active trackway device, he having failed to make his acknowledging act while or before passing such active trackway device.

Having now shown and described rather conventionally one rather simple embodiment of the present invention, it is desired to be understood that a simplified showing has been selected for the purpose of facilitating a disclosure of the nature and underlying principles of the invention, rather than its scope or the exact construction preferably employed in practicing the same, and that various changes, modifications and additions may be made to adapt the invention to more elaborate and varied train control systems, all without departing from the spirit or scope of the invention, or the idea of means underlying the same, except as demanded by the scope of the following claims.

What I claim as new is:—

1. An automatic train control system comprising, automatic brake control apparatus superimposed upon an air brake system of the normally charged brake pipe type, which if initiated will vent the brake pipe to atmospheric pressure, means controlled in accordance with traffic conditions in advance for initiating said brake control apparatus under unfavorable traffic conditions ahead, and manually operable acknowledging means operable by the engineer for limiting to an intermediate value the extent of venting of said brake pipe by said brake control apparatus.

2. An automatic train control system comprising, automatic brake control apparatus superimposed upon an air brake system of the normally charged brake pipe type, which if initiated will vent the brake pipe to atmosphere, means controlled in accordance with traffic conditions ahead, for actuating said brake control apparatus under adverse traffic conditions ahead, manually operable means operable by the engineer for limiting to an intermediate value the extent of venting of said brake pipe by said brake control apparatus, and means for preventing misuse of said manually operable means.

3. An automatic train control system comprising, automatic brake control apparatus superimposed upon an air brake system of the normally charged brake pipe type, which if initiated will vent the brake pipe to atmosphere, means controlled in accordance with traffic conditions ahead for initiating said brake control apparatus under unfavorable traffic conditions, manually operable means operable by the engineer for limiting to an intermediate pressure value the extent of venting of said brake pipe by said brake control apparatus, and means for preventing misuse of said manually operable means including means for operating said brake control apparatus to its active condition if it has not already assumed that condition and rendered active upon operation of said manually operable means.

4. Automatic brake control apparatus comprising, an air brake system of the normally charged brake pipe type wherein venting of the brake pipe results in a brake application, a valve which if moved from its normal position vents said brake pipe to zero pressure, means controlled in accordance with traffic conditions ahead for operating said valve from its normal position, limiting means for discontinuing said venting when said brake pipe has been vented to a predetermined extent above zero pressure, and acknowledging means for rendering said limiting means inactive unless the engineer manifests that he is capable of controlling his train.

5. Automatic brake control apparatus comprising, an air brake system of the normally charged brake pipe type wherein venting of the brake pipe results in a brake application, an equalizing reservoir, a reduction reservoir, a valve which if moved from its normal position vents said equalizing reservoir into said reduction reservoir, means for automatically operating said valve under adverse traffic conditions ahead, and penalty means for venting said reduction reservoir to atmosphere effective unless the engineer manifests his ability to control his train.

6. Automatic brake control apparatus comprising, an air brake system of the normally charged brake pipe type wherein venting of the brake pipe results in a brake application, an equalizing reservoir, a reduction reservoir, a valve which if moved from its normal position vents said equalizing reservoir into said reduction reservoir, means controlled in accordance with traffic conditions ahead for operating said valve, penalty means for venting said reduction reservoir to atmosphere unless the engineer manifests his ability to control his train, and means for preventing the engineer misusing said penalty means.

7. A train control system comprising, normally inactive brake control apparatus which if rendered active vents the brake pipe of the train to effect a brake application, a normally energized electro-pneumatic valve which if it once assumes its de-energized condition remains in that condition until special restoring means is operated, means partly on the vehicle and partly on the track for de-energizing said electro-pneumatic valve, manually operable means for preventing de-energization of said electro-pneumatic valve if operated before said electro-pneumatic valve is de-energized and for restricting the degree of venting of the brake pipe due to operation of said electro-pneumatic valve to an intermediate pressure value if operated after said electro-pneumatic valve is de-energized.

8. A train control system comprising normally inactive brake control apparatus which if rendered active vents the brake pipe of the train to effect a brake application, a normally energized electro-pneumatic valve for holding said brake control apparatus inactive which if it once assumes its deenergized condition remains in that condition until special restoring means is operated, control means partly on the vehicle and partly on the track for deenergizing said electro-pneumatic valve under adverse traffic conditions, manually operable means for preventing deenergization of said electro-pneumatic valve if operated before said electro-pneumatic valve is deenergized, venting limiting means which when active permits venting of said brake pipe by said brake control apparatus to a fractional extent only, and means including said manually operable means for rendering said venting limiting means active effective only if said manually operable means is operated after said control means is actuated in response to unfavorable traffic conditions.

9. A train control system comprising, normally inactive brake control apparatus which if rendered active vents the brake pipe of the train to effect a brake application, a normally energized electro-pneumatic valve which if it once assumes its deenergized condition remains in that condition until special restoring means is operated, control means partly on the vehicle and partly on the track for deenergizing said electro-pneumatic valve under adverse traffic conditions, manually operable means for preventing deenergization of said electro-pneumatic valve if operated before said electro-pneumatic valve is deenergized, venting limiting means for permitting venting of said brake pipe to a limited intermediate value upon deenergization of said electro-pneumatic valve, means including said manually operable means for rendering said venting limiting means effective if said manually operable means is operated after said electro-pneumatic valve is deenergized, and reset means accessible only from the ground for restoring said electro-pneumatic valve after the train has been brought to a stop.

10. A train control system comprising, normally inactive brake control apparatus which if rendered active vents the brake pipe of the train to effect a brake application, a normally energized electro-pneumatic valve which if it once assumes its de-energized condition remains in that condition until special restoring means is operated, means partly on the vehicle and partly on the track for de-energizing said electro-pneumatic valve under adverse traffic conditions, manually operable means for preventing de-energization of said electro-pneumatic valve if operated before said electro-pneumatic valve is de-energized, venting limiting means for venting said brake pipe to a limited fractional extent only upon de-energization of said electro-pneumatic valve, means including said manually operable means for rendering said venting limiting means effective if said manually operable means is operated after said electro-pneumatic valve is de-energized, reset means accessible only from the ground for restoring said electro-pneumatic valve after the train has been brought to a stop, and means for protecting said reset means against misuse.

11. An automatic train control system comprising, automatic brake control apparatus superimposed upon an air brake system of the normally charged brake pipe type which includes an equalizing reservoir and an equalizing discharge piston valve for venting the brake pipe to atmosphere, electro-responsive means controlled in accordance with traffic conditions for venting said equalizing reservoir to atmosphere under unfavorable traffic conditions ahead, and manually operable means operable by the engineer for causing said equalizing reservoir to be vented into a reduction reservoir instead of directly to atmosphere by said electro-responsive means to limit the reduction in brake pipe pressure, said manually operable means being effective only if said electro-responsive means is in a condition for venting said equalizing reservoir.

12. An automatic train control system comprising, automatic brake control apparatus superimposed upon an air brake system of the normally charged brake pipe type, which includes an equalizing reservoir and an equalizing discharge piston valve for venting the brake pipe to atmosphere, automatic means controlled in accordance with traffic conditions for venting said equalizing reservoir to atmosphere under unfavorable traffic conditions ahead, manually operable means operable by the engineer for causing said equalizing reservoir to be vented into a reduction reservoir upon operation of said automatic means to limit the reduction in brake pipe pressure to an intermediate value, and means for preventing misuse of said manually operable means.

In testimony whereof I affix my signature.

CHARLES S. BUSHNELL.